United States Patent
Stemmler

(10) Patent No.: US 11,321,429 B2
(45) Date of Patent: May 3, 2022

(54) SAFETY SYSTEM FOR AN ELECTRONIC DEVICE OF A VEHICLE, ELECTRONIC DEVICE, VEHICLE AND METHOD

(71) Applicant: Robert Bosch GmbH, Stuttgart (DE)

(72) Inventor: Michael Stemmler, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 16/753,973

(22) PCT Filed: Oct. 17, 2018

(86) PCT No.: PCT/EP2018/078357
§ 371 (c)(1),
(2) Date: Apr. 6, 2020

(87) PCT Pub. No.: WO2019/076958
PCT Pub. Date: Apr. 25, 2019

(65) Prior Publication Data
US 2020/0334341 A1    Oct. 22, 2020

(30) Foreign Application Priority Data
Oct. 19, 2017    (DE) .................... 10 2017 218 654.2

(51) Int. Cl.
*G06F 21/12*      (2013.01)
*B60R 16/023*     (2006.01)
*G06F 21/44*      (2013.01)

(52) U.S. Cl.
CPC ........ *G06F 21/123* (2013.01); *B60R 16/0231* (2013.01); *G06F 21/44* (2013.01); *G06F 2221/2111* (2013.01)

(58) Field of Classification Search
CPC ................. G06F 21/123; G06F 21/44; G06F 2221/2111; B60R 16/0231
(Continued)

(56) References Cited

U.S. PATENT DOCUMENTS 10,479,297 B2 *  11/2019  Arai ...................... F02D 29/02
2007/0210743 A1 *  9/2007  Tabei ...................... B60L 58/20
                                                                 320/104

(Continued)

FOREIGN PATENT DOCUMENTS

DE    103 59 487 A1    7/2005
EP     2 892 199 A1    7/2015
(Continued)

OTHER PUBLICATIONS

International Search Report corresponding to PCT Application No. PCT/EP2018/078357, dated Jan. 3, 2019 (German and English language document) (6 pages).

*Primary Examiner* — Michael S McNally
(74) *Attorney, Agent, or Firm* — Maginot, Moore & Beck LLP

(57) ABSTRACT

A security system for a programmable electronic device of a vehicle, the electronic device including an interface that can be used for accessing and/or programming the electronic device by means of an external access. The security system includes a sensor configured to detect a position and/or orientation of the electronic device with respect to the vehicle, and a security module. The security module is configured to determine coincidence based on of the position and/or orientation of the electronic device with respect to the vehicle detected by the sensor and an expected position and/or orientation of the electronic device with respect to the vehicle, and in the event of a detected coincidence prevent access and/or programming of the electronic device.

13 Claims, 1 Drawing Sheet

(58) Field of Classification Search
USPC .......................................................... 726/2
See application file for complete search history.

(56) References Cited

U.S. PATENT DOCUMENTS

| | | |
|---|---|---|
| 2009/0177352 A1 | 7/2009 | Grau et al. |
| 2018/0081671 A1* | 3/2018 | Naruse ................ G06F 16/2365 |
| 2018/0281748 A1* | 10/2018 | Murase .................... G06F 21/51 |
| 2019/0265966 A1* | 8/2019 | Shimomura ............ G06F 21/44 |

FOREIGN PATENT DOCUMENTS

| | | |
|---|---|---|
| JP | 2007-237905 A | 9/2007 |
| JP | 2016-218932 A | 12/2016 |

* cited by examiner

SAFETY SYSTEM FOR AN ELECTRONIC DEVICE OF A VEHICLE, ELECTRONIC DEVICE, VEHICLE AND METHOD

This application is a 35 U.S.C. § 371 National Stage Application of PCT/EP2018/078357, filed on Oct. 17, 2018, which claims the benefit of priority to Serial No. DE 10 2017 218 654.2, filed on Oct. 19, 2017 in Germany, the disclosures of which are incorporated herein by reference in their entirety.

The disclosure relates to a security system for an electronic device of a vehicle, wherein the electronic device is programmable and has an interface that can be used for accessing and/or programming the electronic device by external access, with a security module designed to prevent unauthorized access and/or programming of the electronic device.

Furthermore, the disclosure relates to an electronic device for a vehicle with such a security system, a vehicle with at least one electronic device with such a security system, and a method for operating such a security system, an electronic device with such a security system or a vehicle with at least one electronic device with such a security system.

BACKGROUND

Electronic devices, in particular control units or sensors, for example for engines or transmissions, or security-related devices, for example for the functionality of the vehicle or access to the vehicle, often have security-relevant functions that must be protected against unauthorized access, in particular against unauthorized programming, such as changes to control characteristics, mileages and/or program versions, and/or against changes in the integrity and/or damage to the program, so that undesirable erroneous control occurs. Moreover, such electronic devices have interfaces via which not only communication functions during operation, but also programming, which is used to configure the device, for example. Programming or configuration is often possible via remote access. In order to protect electronic devices from such unauthorized access, for example to block such access, block a function of the device or to prevent unauthorized programming of the device, queries are used to authenticate an access. However, this technique provides only low security, since it cannot be excluded that such software-based authentication systems can be bypassed. Due to the increasing threat of bypassing software-based authentication, improved algorithms and functions are therefore needed to protect an electronic device from unauthorized access, in particular unauthorized programming.

SUMMARY

The disclosure has the advantage that a security system is provided for an electronic device of a vehicle, which prevents access and/or unauthorized programming of the electronic device, in particular subsequent programming after the device has been delivered for its intended use.

The security system according to the disclosure for an electronic device of a vehicle characterized by the fact that the security system has a sensor for detecting a position and/or orientation of the electronic device in and/or on the vehicle. As a result, the actual position and/or orientation of the electronic device in and/or on the vehicle is detected and provided to the security module. Access is understood in particular to mean reading data, for example the program code. In the present case, programming is understood to mean, in particular, a change or at least a partial change of programs or software, in particular a change of the source code of programs. Programming is also preferably understood to mean configuration or coding. A security module is understood in particular to be an element that has a processor, a memory and at least one interface for data transmission. The security module is designed to detect a deviation or a coincidence of the position and/or orientation of the electronic device detected by the sensor, i.e. the actual position and/or orientation, with respect to an expected position and/or orientation, and in the event of a detected coincidence or only a slight deviation to prevent access and/or programming of the electronic device. As a result, unauthorized access and/or unauthorized programming of the electronic device will be prevented if this is installed in the vehicle as intended, i.e. in the expected position and/or orientation in and/or on the vehicle. Requests to the electronic device are preferably ignored. Advantageously, the security system according to the disclosure prevents unauthorized access and/or programming of the electronic device, which in particular is not or is not only dependent on authentication to enable access to and/or programming of the electronic device. As a result, the electronic device cannot be programmed without a change to the installation and/or the electrical connection, especially not by remote access. As a result, it is made possible to prevent manipulation of the electronic device, in particular in the finished installation of the electronic device in and/or on the vehicle and/or during operation of the vehicle. Preferably, already implemented authentication methods may be used in parallel. Preferably, the position and/or the orientation of the electronic device are detected by the sensor continuously or at certain time intervals. As a result it can be detected when the device is removed from the predetermined position and/or orientation and/or whether the position and/or orientation of the electronic device changes during access and/or programming and/or during external access. Preferably, the security module is designed to detect the deviation or coincidence of multiple electronic devices. Preferably, the security system has multiple sensors for detecting the position and/or orientation of the electronic device or of several electronic devices. As a result it is possible to prevent access and/or programming of multiple electronic devices with one security module. Preferably, the security module has a data memory in which data about the expected position and/or orientation of the electronic device, signatures and/or data for the authentication of the electronic devices are stored. Preferably, access to the electronic device is only possible after prior authentication, wherein stored signatures, in particular signatures stored in a data memory, are compared with the entered signatures for authentication. Preferably, access to the security module is only possible after prior authentication. Preferably, the security module is in the form of an integrated circuit or an integrated sensor, in particular it is arranged on the electronic device. Preferably, the interface of the electronic device is a remote interface, for example a WLAN interface, a Bluetooth interface or an infrared interface, via which remote access is possible, wherein the interface is preferably convertible into a remotely maintainable interface. Preferably, the security module prevents access and/or programming of the electronic device by separating the interface of the electronic device from a power source. As a result, external access to the electronic device is no longer possible. Preferably, the security module exchanges data with the electronic device via the interface thereof. As a result, the use of a further interface for data exchange between the security module and the electronic device can be dispensed with.

According to a preferred development of the disclosure, it is provided that the security module is designed to deactivate the interface completely or partially in the event of a detected coincidence. This makes it possible not only to prevent the programming of the electronic device, but also to prevent all external access, wherein in particular reading out data of the electronic device by external access is prevented, or at least an external request during access to the interface is ignored.

According to a preferred further development of the disclosure, it is provided that the security system has at least one switching device that is or can be assigned to the electronic device, by the actuation of which an electrical connection necessary for access and/or programming the electronic device can be broken. As a result, it is enabled that access and/or programming of the electronic device can be prevented until the connection necessary for access and/or programming is restored. In particular, the switching device is in the form of a magnetic field-operated switching device, which acts together with a magnetic field encoder arranged at a location provided on the vehicle. As soon as the device is in the provided position and/or orientation, the switching device is operated by the magnetic field of the magnetic field encoder and thus the connection mentioned is interrupted. Once the device is removed from the position, the connection is restored. The switching device is arranged in particular inside a housing of the electronic device, so that its position cannot be detected from the outside and it therefore cannot be detected by unauthorized persons. Alternatively, the switching device is a controllable switching device, which, for example, works together with the sensor mentioned above, so that if the security module detects a deviation from the predetermined position and/or orientation, the switching device is operated to break the connection. Preferably, the switching device is a switching device that can be controlled by a program and that acts together with an external sensor, in particular an earth magnetic field sensor or an accelerometer.

According to a preferred development of the disclosure, it is provided that the sensor is or can be arranged in or on the electronic device or on the vehicle. As a result, reliable detection of the position and/or orientation of the electronic device by the sensor is guaranteed, since the spatial arrangement of the sensor cannot be changed by external access, in particular by an unauthorized access. Furthermore, cost-effective and time-saving assembly is possible.

According to a preferred development of the disclosure, it is provided that the sensor is a contactless sensor, in particular a magnetic sensor, an ultrasonic sensor, a camera sensor, a position sensor and/or an orientation sensor. In a further preferred development of the disclosure, it is provided that the sensor is a touch sensor.

According to a preferred development of the disclosure, it is provided that the security module is designed to allow access and/or programming of the electronic device in the event of a detected deviation. This enables the electronic device to allow access and/or programming of the electronic device if it is not arranged in the vehicle in the expected position and/or orientation so as to be relevant to security, for example in the removed state or in the workshop.

The electronic device according to the disclosure is characterized by the security system according to the disclosure. In this case, the advantages that have already been explained in connection with the security system also arise for the electronic device.

According to a preferred development of the disclosure, it is provided that the electronic device is in the form of a control unit of the vehicle. As a result, in particular, unauthorized access and/or unauthorized programming of security-relevant electronic devices is prevented. Preferably, the electronic device is a control unit for engines or gearboxes, a navigation device, an immobilizer or a security device. It is preferably provided that the electronic device is designed for checking encrypted signals for further authentication.

The vehicle according to the disclosure is characterized by the fact that it has at least one electronic device and a security system according to the disclosure assigned to the electronic device. In this case, in particular the advantages already described in connection with the security system according to the disclosure and the electronic device according to the disclosure also arise for the vehicle. In the present case, a vehicle is understood in particular to be a passenger car, a truck, a bus or even a boat, a ship or an aircraft.

According to a preferred development of the disclosure, it is provided that the sensor of the security system is arranged in or on the electronic device or on a structure of the vehicle that supports or assigned to the electronic device. As a result, the sensor cannot be manipulated by external access, since the arrangement of the sensor cannot be changed by external access, in particular it cannot be changed spatially relative to the electronic device. Furthermore, cost-effective and time-saving assembly is possible as a result.

The method according to the disclosure for operating a security system according to the disclosure, an electronic device according to the disclosure or a vehicle according to the disclosure is characterized in that unauthorized access and/or programming of the electronic device is prevented if coincidence of the detected position and/or orientation of the electronic device with the expected position and/or orientation is detected. In this context, the advantages already described in connection with the security system, the electronic device and the vehicle arise for the method.

Further preferred features and advantages arise in particular from the matters already described as well as from the following disclosure.

BRIEF DESCRIPTION OF THE DRAWINGS

The invention disclosure will be described below in more detail using an exemplary embodiment. In the figures.

DETAILED DESCRIPTION

Figure 1:
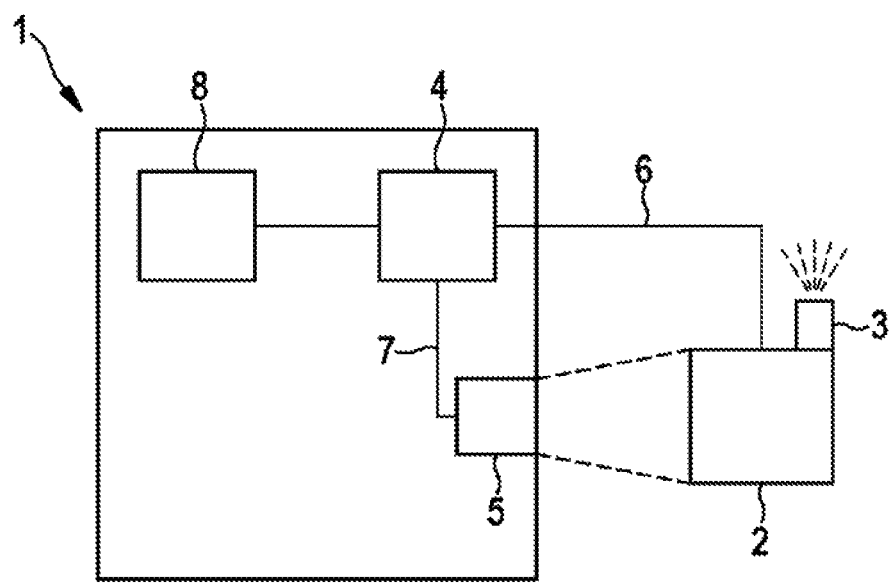
FIG. 1 shows a schematic representation of a block diagram of the security system according to the disclosure.

FIG. 1 shows a schematic representation of a block diagram of the security system 1 according to the disclosure for an electronic device 2 of a vehicle. The electronic device 2 is programmable and has an interface 3 that can be used for access and for programming the electronic device 2 by means of external access. The security system 1 has a security module 4, which is designed to prevent unauthorized access and/or unauthorized programming of the electronic device 2. In another exemplary embodiment, the security module 4 is connected to a data memory 8 and/or a computer. Furthermore, the security system 1 has a sensor 5 for detecting a position and/or orientation of the electronic device 2 in and/or on the vehicle (the vehicle is not shown). In a further exemplary embodiment, the security module 4 is connected via a data connection 6 to the electronic device 2 for the exchange of data. The security module 4 is designed to detect a coincidence with or deviation from the position and/or orientation of the electronic device 2 detected by the sensor 5 with an expected position and/or orientation and to prevent access and/or programming of the electronic device 2 in the event of a detected coincidence. The security module 4 does not allow access and/or programming of the electronic device 2 when the electronic device 2 is installed as intended. In one exemplary embodiment, the interface 3 is completely or partially deactivated for this purpose and/or the power supply of the electronic device 2 is interrupted. In another exemplary embodiment, the security module 4 is connected to the sensor 5 via a data connection 7 for the exchange of data. Therefore a mechanical change, preferably a spatial change, must be made to the electronic device 2 to enable access and/or programming of the electronic device 2, in particular in the position and/or orientation thereof in and/or on the vehicle, which is not possible via remote access. In one exemplary embodiment, the sensor 5 is arranged in or on the electronic device 2 or on the vehicle, whereby cost-effective and time-saving assembly is possible.

Figure 2:
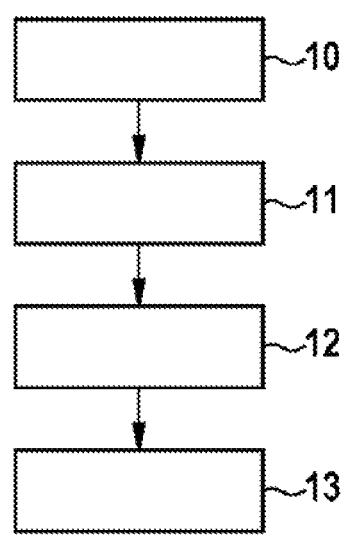
FIG. 2 shows a flowchart for describing the process of the security system according to the disclosure.

FIG. 2 shows a flowchart describing the steps of the method for operating the security system 1. Data about the actual position and/or orientation of the electronic device 2 are collected 10 by the sensor 5. The security module 4 performs a comparison 11 of the data 10 about the actual position and/or orientation of the electronic device 2 detected by the sensor 5 with data about the expected position and/or orientation of the electronic device 2. The data about the expected position are either available directly in the security module 4 or can also be provided by an additional data memory 8. The security module 4 detects by the comparison 11 of the data whether there is a deviation or coincidence 12 of the position and/or orientation of the electronic device 2 in and/or on the vehicle. Based on the deviation or coincidence detected by the security module 4, the security module 4 controls the electronic device 2, so that in the event of a coincidence or a minimum deviation 12 of the position and/or orientation of the electronic device 2 and the expected position and/or orientation of the electronic device 2, access and/or programming of the electronic device 2 13 is prevented, and that in the event of a detected deviation 12 of the position and/or orientation of the electronic device 2 from an expected position and/or orientation of the electronic device 2, access and/or programming of the electronic device 2 is allowed. The security module 4 therefore does not allow access and/or programming when the electronic device 2 is installed as intended, in particular requests to the electronic device are ignored. In a further exemplary embodiment, an authentication is additionally required for access and/or for programming the electronic device 2.

The invention claimed is:

1. A security system for a programmable electronic device of a vehicle, the programmable electronic device including an interface configured to enable at least one of accessing and programming the programmable electronic device by an external access, the security system comprising:
 a sensor configured to detect at least one of a position and an orientation of the programmable electronic device with respect to the vehicle; and
 a security circuit configured to:
  compare the at least one of the detected position and the detected orientation with at least one of an expected position and an expected orientation of the programmable electronic device with respect to the vehicle; and
  prevent the at least one of the accessing and the programming of the programmable electronic device in response to the at least one of the detected position and the detected orientation coinciding with the at least one of the expected position and the expected orientation in the comparison.

2. The security system as claimed in claim 1, wherein the security circuit is further configured to disable the interface in response to the the at least one of the detected position and the detected orientation coinciding with the at least one of the expected position and the expected orientation in the comparison.

3. The security system as claimed in claim 1, the security system further comprising:
 at least one switching device assigned to the programmable electronic device, the at least one switching device configured to interrupt an electrical connection necessary for the at least one of the accessing and the programming of the programmable electronic device.

4. The security system as claimed in claim 1, wherein the sensor is configured to be arranged in or on the programmable electronic device.

5. The security system as claimed in claim 1, wherein the sensor is a contactless sensor.

6. The security system as claimed in claim 1, wherein the security circuit is further configured to:
 allow the at least one of the accessing and the programming of the programmable electronic device in response to the at least one of the detected position and the detected orientation deviating from the at least one of the expected position and the expected orientation in the comparison.

7. The security system as claimed in claim 1, wherein the security circuit is further configured to disable the interface completely in response to the at least one of the detected position and the detected orientation coinciding with the at least one of the expected position and the expected orientation.

8. The security system as claimed in claim 1, wherein the sensor is configured to be arranged on the vehicle.

9. The security system as claimed in claim 1, wherein the sensor is one or more of a magnetic sensor, an ultrasonic sensor, a camera sensor, a position sensor and an orientation sensor.

10. A vehicle, comprising:
 a programmable electronic device including an interface configured to enable at least one of accessing and programming the programmable electronic device by an external access; and
 a security system including:
  a sensor configured to detect at least one of a position and an orientation of the programmable electronic device with respect to the vehicle; and
  a security circuit configured to:
   compare the at least one of the detected position and the detected orientation with at least one of an expected position and an expected orientation of the programmable electronic device with respect to the vehicle; and
   prevent the at least one of the accessing and the programming of the programmable electronic device in response to the at least one of the detected position and the detected orientation coinciding with the at least one of the expected position and the expected orientation.

11. The vehicle as claimed in claim 10, wherein the programmable electronic device is in the form of a control unit of the vehicle.

12. The vehicle as claimed in claim 10, wherein the sensor of the security system is arranged in or on the programmable electronic device or on a structure of the vehicle that supports or is assigned to the programmable electronic device.

13. A method for operating a security system for a programmable electronic device of a vehicle, the programmable electronic device including an interface configured to enable at least one of accessing and programming the programmable electronic device by an external access, the method comprising:

detecting, with a sensor of the security system, at least one of a position and an orientation of the programmable electronic device with respect to the vehicle;

comparing, with a security circuit of the security system, the at least one of the detected position and the detected orientation with at least one of an expected position an expected orientation of the programmable electronic device with respect to the vehicle; and preventing, with the security circuit, the at least one of the accessing and the programming of the programmable electronic device in response to the at least one of the detected position and the detected orientation coinciding with the at least one of the expected position and the expected orientation in the comparison.

\* \* \* \* \*